US012698100B2

(12) United States Patent
Brawley et al.

(10) Patent No.: US 12,698,100 B2
(45) Date of Patent: Aug. 4, 2026

(54) SATELLITE WITH AN OPTICAL ADJUSTMENT DEVICE AND RELATED METHODS

(71) Applicant: Eagle Technology, LLC, Melbourne, FL (US)

(72) Inventors: Aidan Brawley, Reading, MA (US); Samuel Han, Boston, MA (US); Ethan Huffman, Medford, MA (US); Daniel DeSantis, Billerica, MA (US); Alan Akerstrom, Westford, MA (US); James Guregian, Chelmsford, MA (US); Damien Madden, Groton, MA (US); John Gorman, Winchester, MA (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 284 days.

(21) Appl. No.: 18/407,507

(22) Filed: Jan. 9, 2024

(65) Prior Publication Data

US 2025/0223055 A1      Jul. 10, 2025

(51) Int. Cl.
| | |
|---|---|
| *B64G 1/10* | (2006.01) |
| *G02B 7/00* | (2021.01) |
| *G02B 7/182* | (2021.01) |
| *G02B 7/183* | (2021.01) |
| *G02B 7/198* | (2021.01) |

(52) U.S. Cl.
CPC ........... *B64G 1/1021* (2013.01); *G02B 7/003* (2013.01); *G02B 7/005* (2013.01); *G02B 7/182* (2013.01); *G02B 7/1821* (2013.01);

*G02B 7/1827* (2013.01); *G02B 7/183* (2013.01); *G02B 7/198* (2013.01)

(58) Field of Classification Search
CPC .... B64G 1/1021; B64G 1/1028; G02B 7/003; G02B 7/005; G02B 7/182; G02B 7/1821; G02B 7/1827; G02B 7/183; G02B 7/198
See application file for complete search history.

(56) References Cited

U.S. PATENT DOCUMENTS

| | | | |
|---|---|---|---|
| 4,410,233 | A | 10/1983 | Gerhardt et al. |
| 4,690,519 | A | 9/1987 | Clark et al. |
| 6,767,155 | B2 | 7/2004 | O'Brien et al. |
| 2017/0315429 | A1* | 11/2017 | Imaizumi ............... G03B 13/08 |
| 2018/0157930 | A1* | 6/2018 | Rutschman ............ H04N 25/41 |

* cited by examiner

*Primary Examiner* — Nathanael R Briggs
(74) *Attorney, Agent, or Firm* — ALLEN, DYER, DOPPELT, + GILCHRIST, P.A.

(57) ABSTRACT

A satellite may include an optical component, and an optical adjustment device coupled to the optical component. The optical adjustment device may include a base, and an adjustment flexure carried by the base. The adjustment flexure may be moveable between an unflexed neutral position and a flexed first position, and between the unflexed neutral position and a flexed second position. The optical adjustment device may further include a rotatable drive shaft carried by the base, a drive cam carried by the rotatable drive shaft, a first cam follower and a second cam follower. The cam may cause the first and second cam followers to selectively move the adjustment flexure between the unflexed neutral position and the flexed first flexed position or the second flexed position.

26 Claims, 8 Drawing Sheets

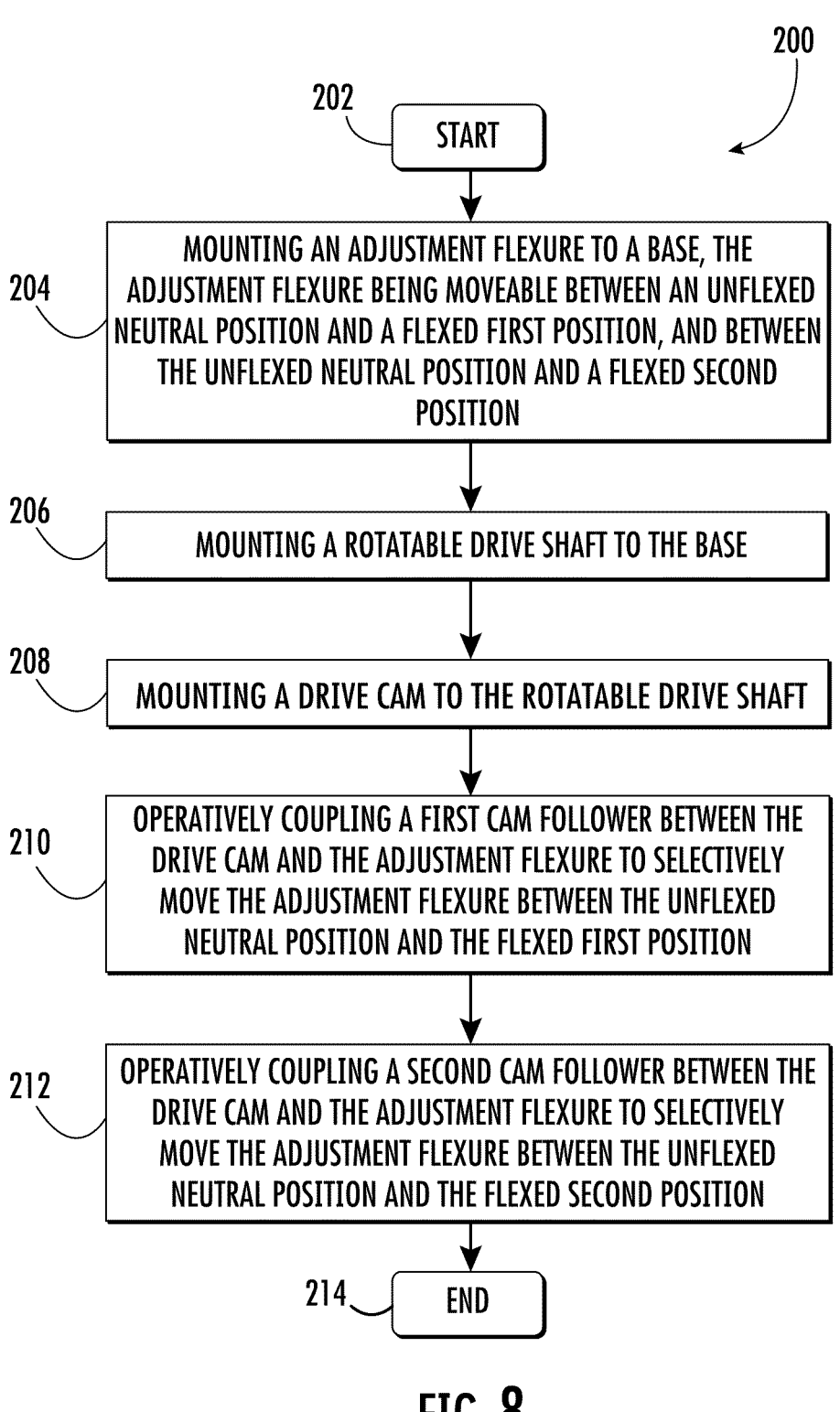

200

202

START

204

MOUNTING AN ADJUSTMENT FLEXURE TO A BASE, THE ADJUSTMENT FLEXURE BEING MOVEABLE BETWEEN AN UNFLEXED NEUTRAL POSITION AND A FLEXED FIRST POSITION, AND BETWEEN THE UNFLEXED NEUTRAL POSITION AND A FLEXED SECOND POSITION

206

MOUNTING A ROTATABLE DRIVE SHAFT TO THE BASE

208

MOUNTING A DRIVE CAM TO THE ROTATABLE DRIVE SHAFT

210

OPERATIVELY COUPLING A FIRST CAM FOLLOWER BETWEEN THE DRIVE CAM AND THE ADJUSTMENT FLEXURE TO SELECTIVELY MOVE THE ADJUSTMENT FLEXURE BETWEEN THE UNFLEXED NEUTRAL POSITION AND THE FLEXED FIRST POSITION

212

OPERATIVELY COUPLING A SECOND CAM FOLLOWER BETWEEN THE DRIVE CAM AND THE ADJUSTMENT FLEXURE TO SELECTIVELY MOVE THE ADJUSTMENT FLEXURE BETWEEN THE UNFLEXED NEUTRAL POSITION AND THE FLEXED SECOND POSITION

214    END

FIG. 8

SATELLITE WITH AN OPTICAL ADJUSTMENT DEVICE AND RELATED METHODS

TECHNICAL FIELD

The present disclosure relates to optical image devices, and, more particularly, to an optical adjustment device and related methods, such as for a satellite.

BACKGROUND

Optical imaging devices, such as optical telescopes, may be carried by satellites. Optical telescopes include optical components, such as mirrors, for example, for gathering light and forming images. One of the mirrors may be adjustable in location to provide for changes in focus, herein referred to as a "focus mirror."

An optical telescope may use an optical adjustment device coupled to the focus mirror, which may be used to provide an optimal focus to achieve a desired resolution for the optical telescope. The optical adjustment device allows for very fine displacement of the focus mirror.

One approach for an optical adjustment device is a lead screw driven mechanism to provide high mechanical advantages and modularity. A lead screw driven mechanism can take up a significant system weight/space budget, since the diameter of the lead screw grows exponentially with the required amount of precision to accommodate a higher number of threads per inch.

Another common approach for an optical adjustment device is a bar linkage system with multiple flexures. A bar linkage system may be costly to manufacture due to its high number of parts, which typically require precise alignment and shimming during assembly.

Smaller and simpler optical telescopes may not use an optical adjustment device coupled to the focus mirror. However, the optics can shift out of focus due to thermal extremes and other various environmental effects placed on the optical telescope. This may be acceptable when high resolution is not a requirement, but modern optical telescopes frequently require a high degree of resolution based on current mission requirements.

Consequently, there is a need for an optical adjustment device for optical telescopes that is more readily manufactured and less expensive.

SUMMARY

A satellite includes an optical component, and an optical adjustment device coupled to the optical component. The optical adjustment device may include a base, and an adjustment flexure carried by the base. The adjustment flexure may be moveable between an unflexed neutral position and a flexed first position, and between the unflexed neutral position and a flexed second position. The optical adjustment device may further include a rotatable drive shaft carried by the base, a drive cam carried by the rotatable drive shaft, a first cam follower and a second cam follower. The drive cam may cause the first and second cam followers to selectively move the adjustment flexure between the unflexed neutral position and the flexed first flexed position or the second flexed position. At least one optical component may include a focus mirror.

The adjustment flexure may include an upper frame member, a lower frame member, and a plurality of flexure linkage members coupled therebetween. The adjustment flexure may be integrally formed as a monolithic unit.

An electrically controllable lock may be associated with the adjustment flexure to selectively lock the adjustment flexure in the unbiased neutral position.

A position sensor may be configured to sense a position of the adjustment flexure, and a drive motor may be operatively coupled to the drive shaft. The satellite comprising a controller coupled to the drive motor and the position sensor, and configured to rotate the drive cam to move the adjustment flexure between.

The optical adjustment device may include a first shaft for the first cam follower and a second shaft for the second cam follower, with the first and second shafts being coplanar with the drive shaft for the drive cam. Alternatively, the first and second shafts may be non-coplanar with the drive shaft for the drive cam.

Another aspect is directed to an optical adjustment device for at least one optical component that includes a base and an adjustment flexure carried by the base. The adjustment flexure may be moveable between an unflexed neutral position and a flexed first position, and between the unflexed neutral position and a flexed second position. A rotatable drive shaft may be carried by the base, and a drive cam may be carried by the rotatable drive shaft. A first cam follower may be operatively coupled between the drive cam and the adjustment flexure to selectively move the adjustment flexure between the unflexed neutral position and the flexed first position. A second cam follower may be operatively coupled between the drive cam and the adjustment flexure to selectively move the adjustment flexure between the unflexed neutral position and the flexed second position.

Yet another aspect is directed to a method for making an optical adjustment device for at least one optical component as described above. The method may include mounting an adjustment flexure to a base. The adjustment flexure may be moveable between an unflexed neutral position and a flexed first position, and between the unflexed neutral position and a flexed second position. A rotatable drive shaft is mounted to the base, and a drive cam is mounted to the rotatable drive shaft. The method may include operatively coupling a first cam follower between the drive cam and the adjustment flexure to selectively move the adjustment flexure between the unflexed neutral position and the flexed first position, and operatively coupling a second cam follower between the drive cam and the adjustment flexure to selectively move the adjustment flexure between the unflexed neutral position and the flexed second position.

BRIEF DESCRIPTION OF THE DRAWINGS

FIG. 8 is a flow diagram on a method for making the optical adjustment device illustrated in FIG. 1.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout, and prime notation is used to indicate similar elements in different embodiments.

Figure 1:
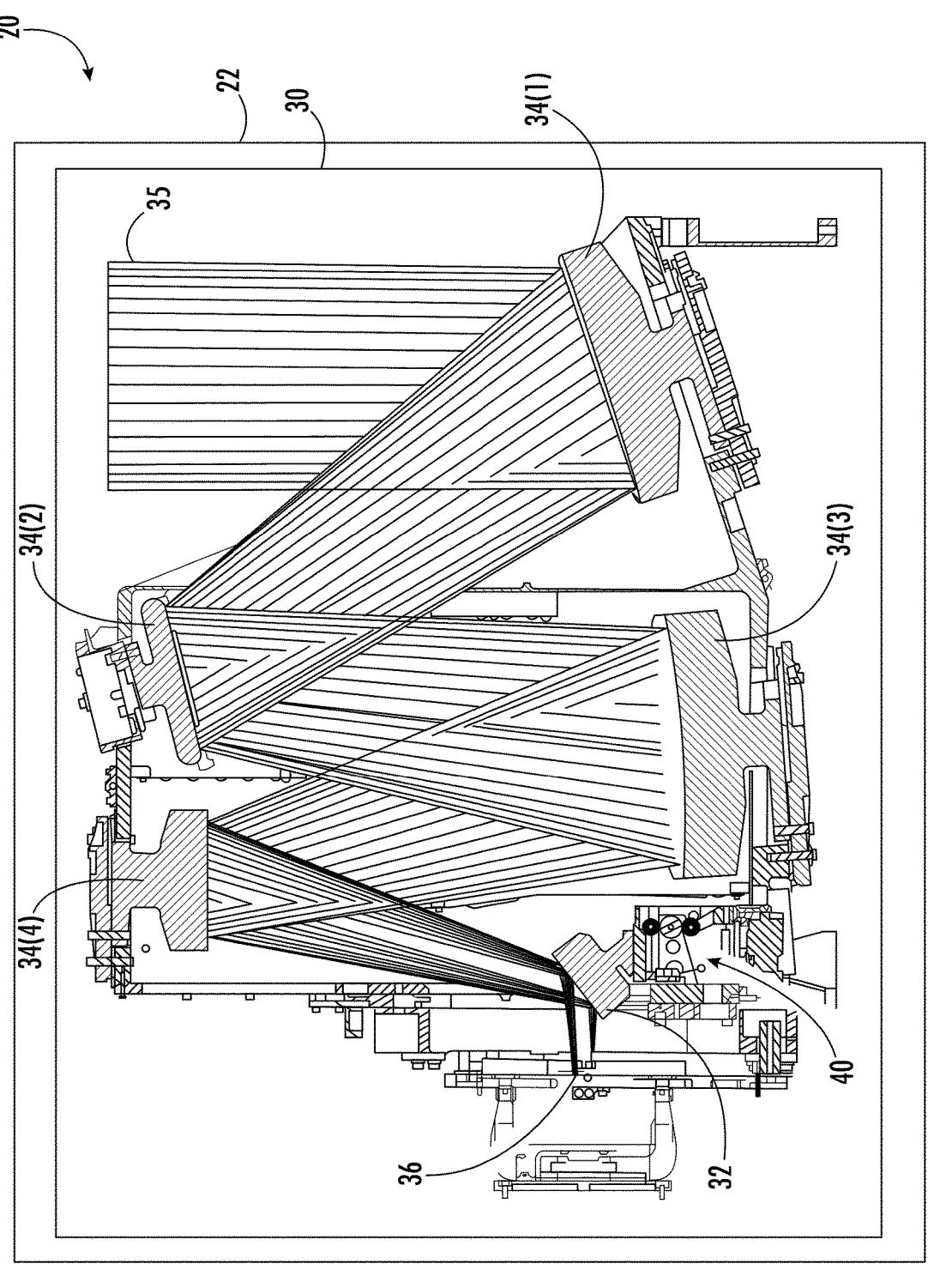
FIG. 1 is a schematic view of a satellite with an optical adjustment device in accordance with the invention.

Referring initially to FIG. 1, a satellite 20 includes a satellite housing 22, and an optical imaging device 30 carried by the satellite housing 22. After launch, the satellite 20 may be configured to orbit a planet, such as earth. The optical imaging device 30 may be an optical telescope, for example, directed towards earth's surface.

The optical imaging device 30 includes an optical component 32 and optical components 34(1)-34(4). Optical component 30 is configured as a focus mirror, and optical components 34(1)-34(4) are configured as stationary reflecting mirrors 32(1)-32(4). Reflecting mirror 34(1) collects light 35 reflected from the earth's surface that is then reflected by reflecting mirrors 34(2)-34(4) to the focus mirror 30. Light 35 representing an image is reflected by the focus mirror 32 to an optical detector 36.

The focus mirror 32 is coupled to an optical adjustment device 40 and is positioned so that the optical telescope 30 is in nominal focus. The optical adjustment device 40 allows for very fine displacement of the focus mirror 32 to compensate or correct for environmental factors placed on the optical telescope 30 which may cause focus of the optical elements 32, 34(1)-34(4) to shift. The environmental factors include temperatures swings that may vary between −30° C. to +85° C. or greater ranges, for example, which may cause metal parts of the optical telescope 30 to expand or shrink. The environmental factors also include vibration experienced by the optical telescope 30 while the satellite 20 is in orbit.

Figure 2:
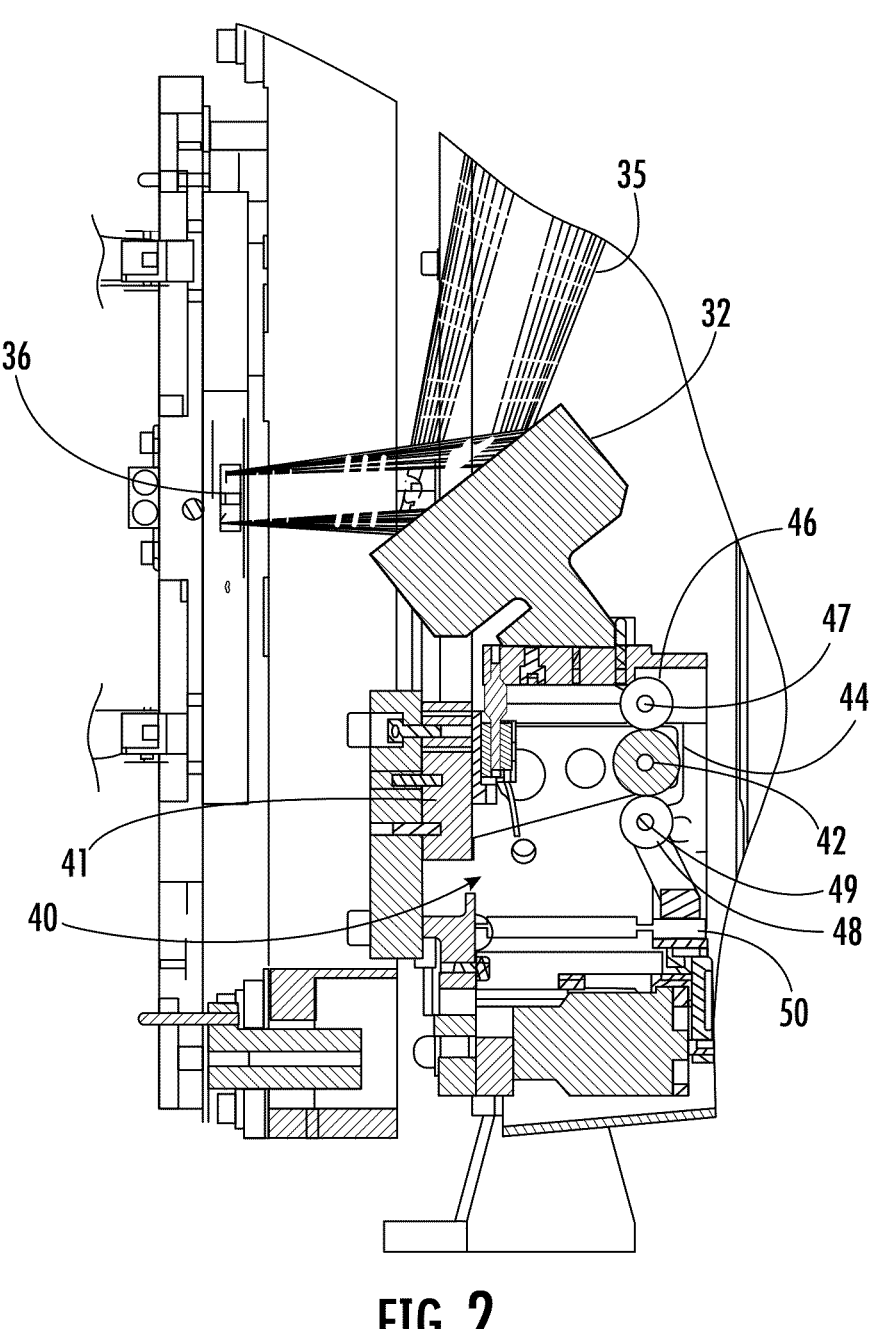
FIG. 2 is a partial view of the optical adjustment device illustrated in FIG. 1.
Figure 3:
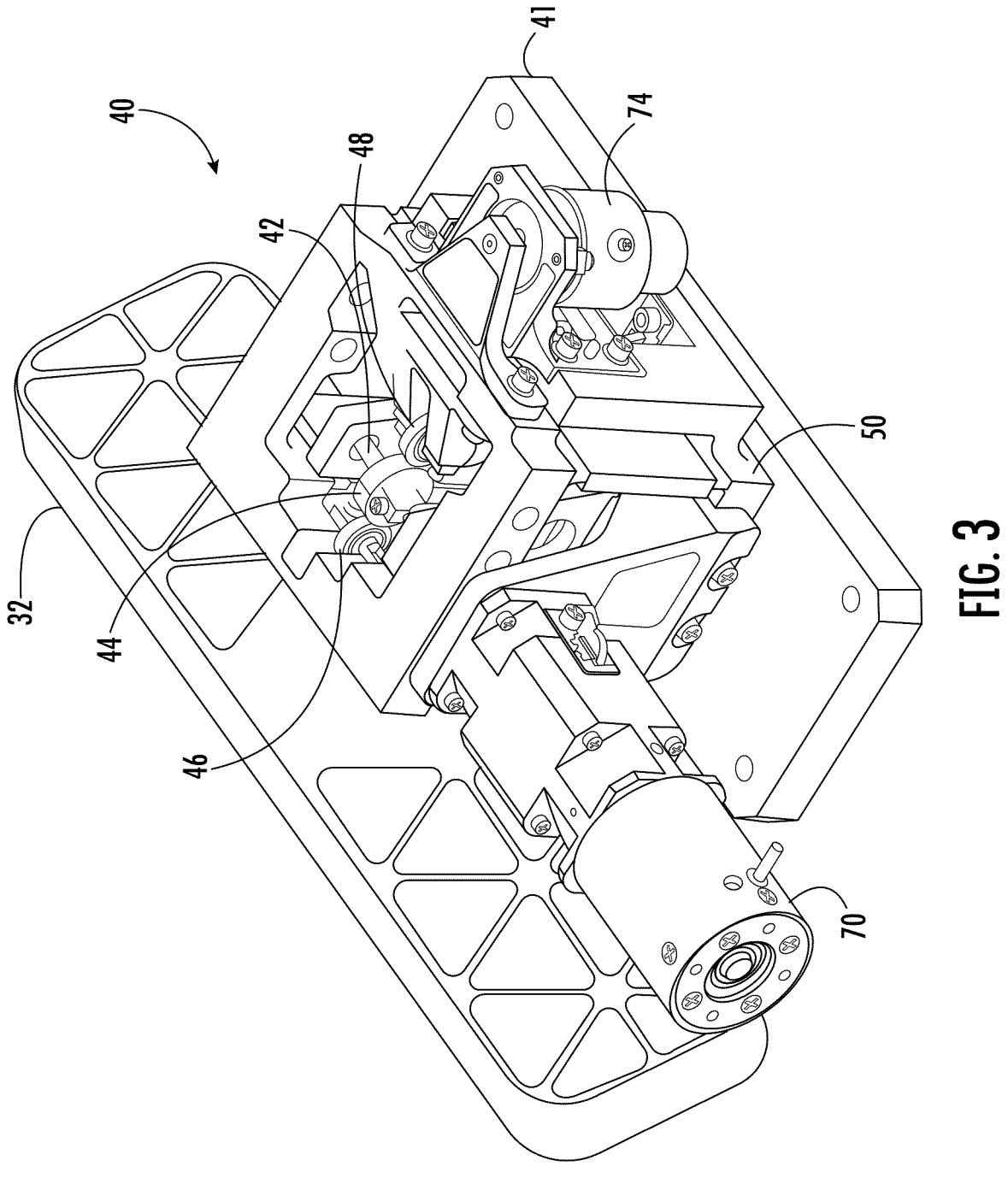
FIG. 3 is an upper side perspective view of the optical adjustment device illustrated in FIG. 1.

The optical adjustment device 40 includes a base 41, and an adjustment flexure 50 carried by the base 41, as shown in FIGS. 2 and 3. The adjustment flexure 50 is moveable between an unflexed neutral position and a flexed first position, and between the unflexed neutral position and a flexed second position. A rotatable drive shaft 42 is carried by the base 41, and a drive cam 44 is carried by the rotatable drive shaft 42.

A first cam follower 46 is operatively coupled between the drive cam 44 and the adjustment flexure 50 to selectively move the adjustment flexure 50 between the unflexed neutral position and the flexed first position. A second cam follower 48 is operatively coupled between the drive cam 44 and the adjustment flexure 50 to selectively move the adjustment flexure 50 between the unflexed neutral position and the flexed second position. The first cam follower 46 rotates about a first shaft 47, and the second cam follower 48 rotates about a second shaft 49. The first and second shafts 47, 49 are coplanar with the drive shaft 42 in the illustrated embodiment.

The adjustment flexure 50 will now be discussed in greater detail with reference to FIGS. 4-6. The adjustment flexure 50 includes an upper frame member 52, a lower frame member 54, and flexure linkage members 56 coupled between the upper and lower frame members 52, 54. The flexure linkage members 56 flex when a load is applied to the upper frame member 52. Even though two flexure linkage members are shown in the figures, the adjustment flexure 50 has four flexure linkage members 56, two on each side and aligned with one another.

The adjustment flexure 50 may be formed using 3D printing, and in particular, using electrical discharge machining (EDM). Electrical discharge machining is a precision manufacturing process through which a desired shape is cut to held tolerances of up to +/−0.001 mm using electrical discharges across a fine wire. Electrical discharge machining may also be referred to as spark machining, spark eroding or wire erosion. The adjustment flexure 50 starts off as a solid block of material, such as a block of titanium. An example size of the solid block may be a 3 inch cube. Electrical discharge machining removes titanium from the block to form the adjustment flexure 50 as a monolithic unit.

Configuration of the adjustment flexure 50 as monolithic unit with four flexure linkage members 56 advantageously allows the optical adjustment device 40 to be lightweight with a small form factor. In addition, an optical adjustment device 40 with a single drive cam 44 and a pair of cam followers 46, 48 allows for a simpler and more cost effective design as compared to more complex focus mechanisms.

The first and second cam followers 46, 48 are carried by the adjustment flexure 50 and are positioned to come in contact with the drive cam 44 based on rotation of the drive cam 44 by the drive shaft 42. The drive shaft 42 is rotated by a drive motor 70, which is operated by a controller 72 coupled to the drive motor 70.

Figure 4:
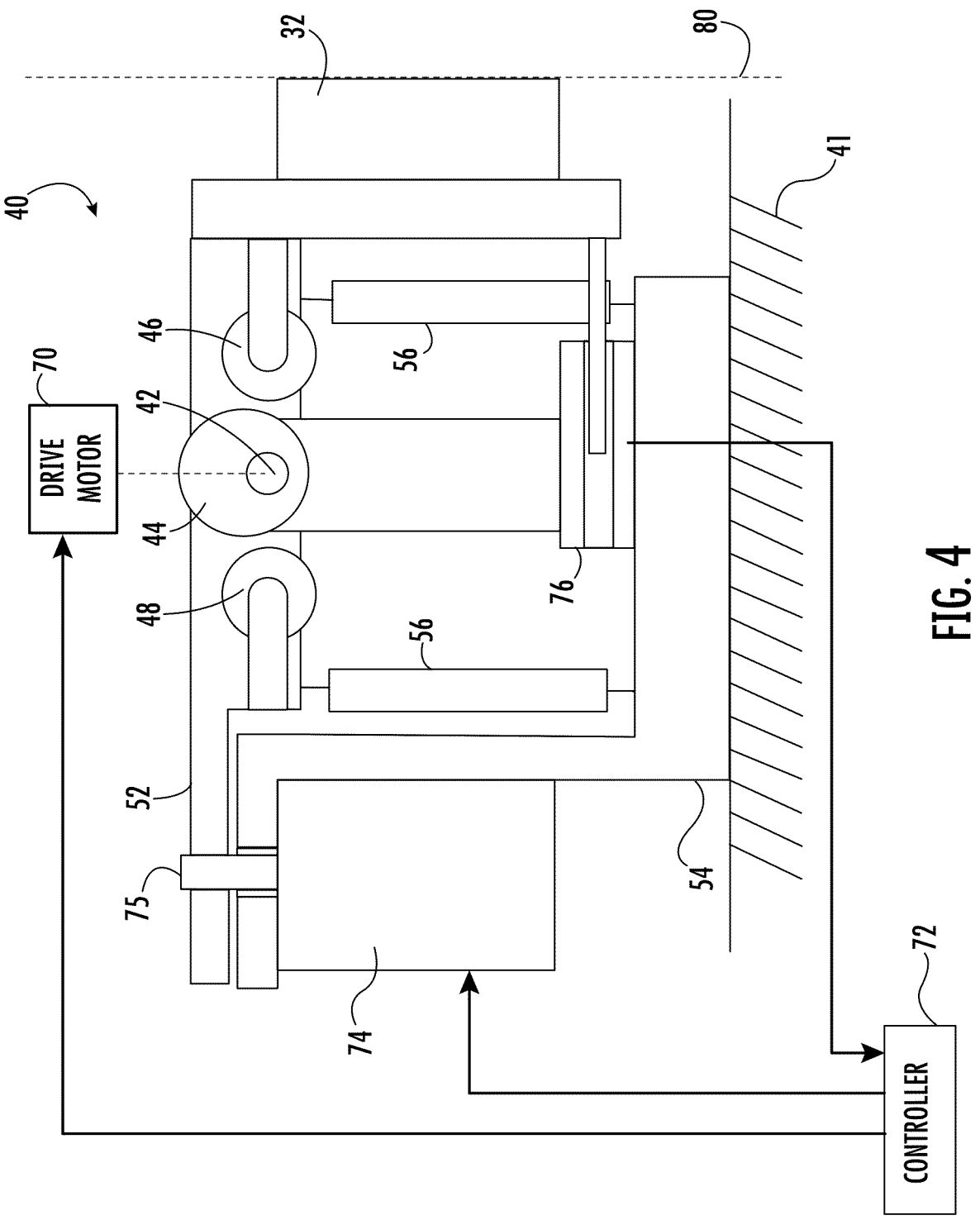
FIG. 4 is a schematic cross-sectional side view of the optical adjustment device illustrated in FIG. 1 with the adjustment flexure in an unflexed neutral position.
Figure 5:
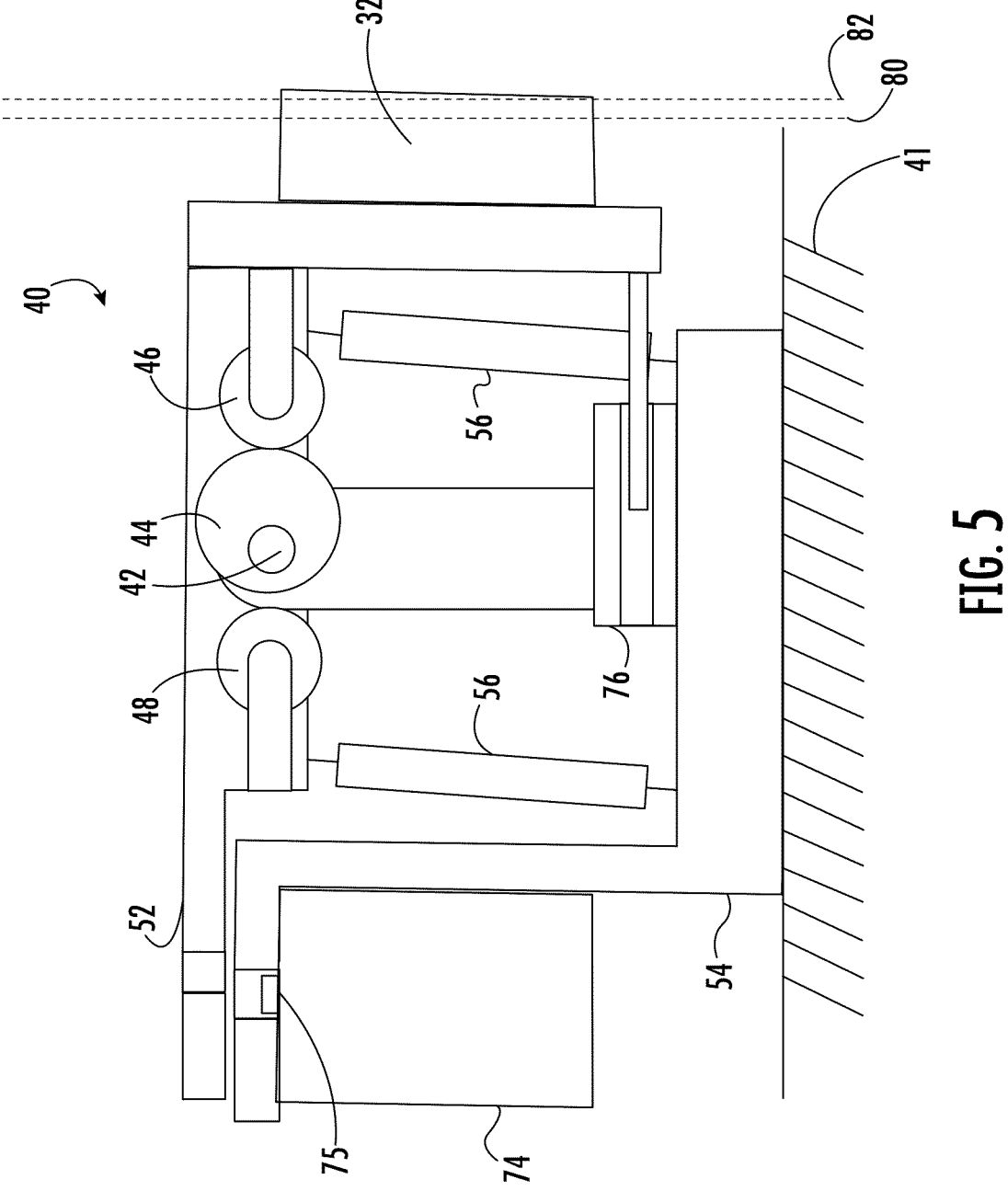
FIG. 5 is a schematic cross-sectional side view of the optical adjustment device illustrated in FIG. 1 with the adjustment flexure in a flexed first position.

In FIG. 4, the adjustment flexure 50 is in an unflexed neutral position. The drive cam 44 is rotated away from the first and second cam followers 46, 48 so that there is a first nominal gap between the drive cam 44 and the first cam follower 46, and a second nominal gap between the drive cam 44 and the second cam follower 48. The adjustment flexure 50 is in a relaxed, unloaded state since there is no load path between the drive cam 44 and the first and second cam followers 46, 48.

In addition, the focus mirror 32 is in a state of optimal focus when the adjustment flexure 50 is in the unflexed neutral position, as indicated by dashed line 80. This is advantageous in case the optical adjustment device 40 becomes inoperable during operation of the optical telescope 30.

The unflexed neutral position of the adjustment flexure 50 corresponds to an initial pre-launch state of the satellite 20 and represents the nominal state of focus. The resolution of the telescope is most likely to be acceptable at any given time provided the range of possible operating environments for the satellite. An electrically controllable lock 74 is associated with the adjustment flexure 50 to selectively lock the adjustment flexure 50 in the unbiased neutral position. The electrically controllable lock 74 is coupled to the controller 72. A pin 75 extends from the electrically controllable solenoid lock 74 through the lower and upper frame members 52, 54 of the adjustment flexure 50.

With the pin 75 being extended and the drive cam 44 and the first and second cam followers 46, 48 being decoupled from one another, this advantageously allows launch loads (e.g., vibration and shock) to bypass the four flexure linkage members 56 in the adjustment flexure 50. Instead, the launch loads are transmitted through the more rigid elements associated with the optical adjustment device 40.

Once the optical telescope 30 is in orbit, the pin 75 from the electrically controllable lock 74 is retracted to allow movement of the adjustment flexure 50. Movement of the adjustment flexure 50 may be needed if focus of the optical components 32, 34(1)-34(4) has shifted due to environmental factors placed on the optical telescope 30. As noted above, the environmental factors include temperatures swings and vibration.

The controller 72 is configured to receive sensor metrics from the optical detector 36 to determine if focus of the image received by the optical detector 36 is optimal. If the focus is not optimal, then the controller 72 rotates the drive cam 44 in order to move the adjustment flexure 50 in a desired direction.

A position sensor 76 is configured to sense position of the adjustment flexure 50. The position sensor 76 may be a linear variable differential transformer (LVDT), for example, to provide positional feedback on position of the adjustment flexure 50 to the controller 72. Position of the adjustment flexure 50 corresponds to position of the focus mirror 32.

If focus of the optical components 32, 34(1)-34(4) has shifted, then the controller 72 is configured to determine which direction the focus mirror 32 needs to move. Movement of the adjustment flexure 50 from the unflexed neutral position to the flexed first position is shown in FIG. 5.

In the flexed first position, the drive cam 44 is rotated to close the first nominal gap by making contact with the first cam follower 46. The focus mirror 32 is moved in a forward direction from the position represented by dashed line 80 closer towards the optical detector 36 represented by dashed line 82. Since the first cam follower 46 is attached to the upper frame member 52, the upper frame member 52 and the flexure linkage members 56 are shifted in the forward direction. The range of travel of the focus mirror 32 is driven by dimensions (i.e., eccentricity) of the drive cam 44.

Figure 6:
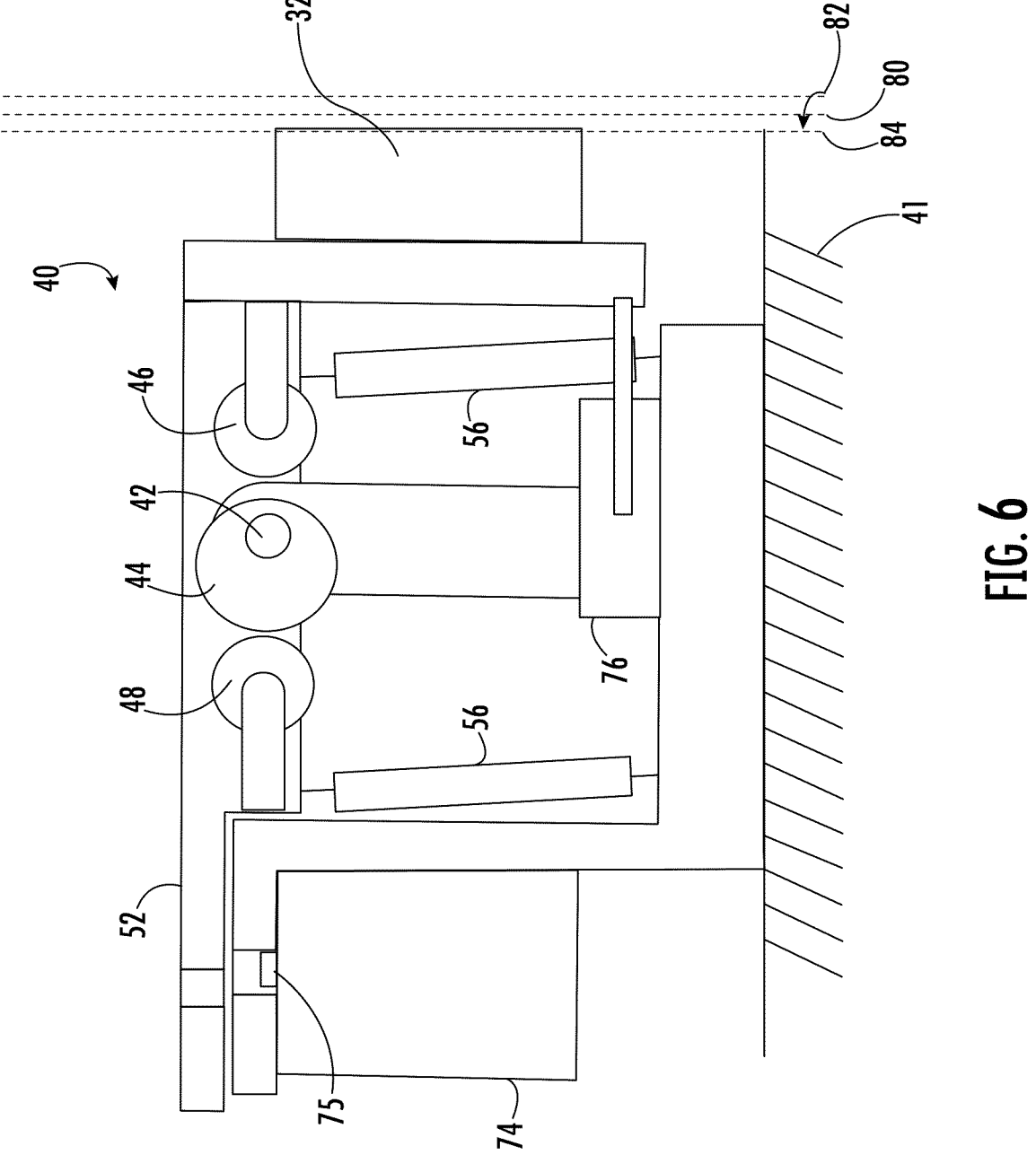
FIG. 6 is a schematic cross-sectional side view of the optical adjustment device illustrated in FIG. 1 with the adjustment flexure in a flexed second position.

Movement of the adjustment flexure 50 from the unflexed neutral position to the flexed second position is shown in FIG. 6. In the flexed second position, the drive cam 44 is rotated to close the second nominal gap by making contact with the second cam follower 48.

The focus mirror 32 is moved in a backward direction from the position represented by dashed line 80 away from the optical detector 36 represented by dashed line 84. Since the second cam follower 48 is attached to the upper frame member 52, the upper frame member 52 and the flexure linkage members 56 are shifted in the backward direction.

The optical adjustment device 40 has been discussed with respect to an optical telescope 30 carried by a satellite 20. In other use cases, the optical adjustment device 40 may be used for ground and air applications. The land-based or airborne optical imaging device may be operating in an area subjected to extreme temperature swings. This may cause focus of the optical components of the optical imaging device to shift. The optical adjustment device 40 compensates or corrects for the extreme temperature extremes.

As noted above, the drive shaft 42 for the drive cam 44 is coplanar with the first and second shafts 47, 49 for the first and second cam followers 46, 48. In the unflexed neutral position, there is a first nominal gap between the drive cam 44 and the first cam follower 46 and a second nominal gap between the drive cam 44 and the second cam follower 48.

Consequently, for the drive cam 44 to make contact with the first cam follower 46 or the second cam follower 48, the drive cam 44 is rotated to close the first nominal gap or the second nominal gap depending on which direction the adjustment flexure 50 is to move. The respective first and second nominal gaps cause the drive cam 44 to pass through a control deadband before reaching the first cam follower 46 or the second cam follower 48. The control deadband may also be referred to as a dead zone or a neutral zone.

Another embodiment of the optical adjustment device 40' is for the drive cam 44' and the first and second cam followers 46', 48' to be offset from one another. That is, the drive shaft 42' for the drive cam 44' is non-planar with the first shaft 47' for the first cam follower 46' and non-planar with the second shaft 49' for the second cam follower 48'. The offset allows the optical adjustment device 40' to eliminate having the drive cam 44' pass through the first or second nominal gaps when the optical telescope 30' is in orbit.

Figures 7A, 7B, 7C:
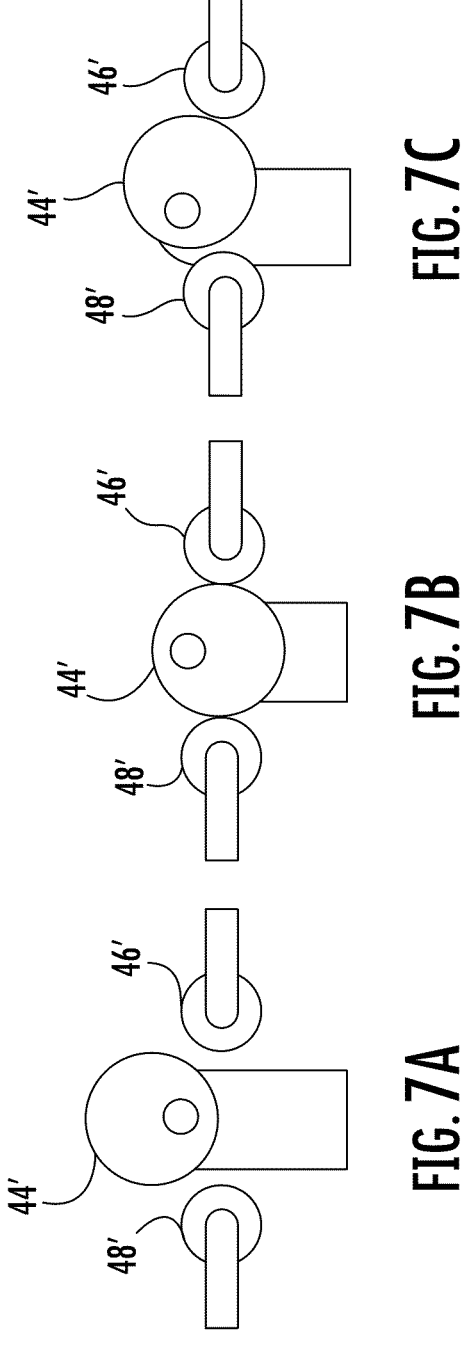
FIGS. 7A-7C are schematic views of the cam and cam followers in an alternative embodiment of the optical adjustment device illustrated in FIG. 1 where the drive cam and two cam followers are non-coplanar.

However, during launch of the optical telescope 30', the drive cam 44' is rotated away from the first and second cam followers 46', 48' so that the first and second nominal gaps are still present, as shown in FIG. 7A. This advantageously allows the adjustment flexure 50' to be in a relaxed, unloaded state since there is no load path between the drive cam 44' and the first and second cam followers 46', 48'.

Once the optical telescope 30' is in orbit, the drive cam 44' is rotated 180 degrees, as shown in FIG. 7B. The drive cam 44' makes contact with both the first and second cam followers 46', 48' when the adjustment flexure 50' is in the unflexed neutral position.

The first and second nominal gaps are no longer present, which eliminates the control deadband. This allows for a simplified control loop for determining movement of the adjustment flexure 50'. In addition, there is an added benefit of having vibration of the upper fame member 52' and the flexure linkage members 56' dampen more quickly since the drive cam 44' is contacting both the first and second cam followers 46', 48' in the unflexed neutral position. While vibration is minimal for space-based applications, vibration is more common in ground-based and airborne applications.

If focus of the optical imaging device has shifted, then the drive cam 44' may be rotated forward towards the first cam follower 46', as shown in FIG. 7C. Since the drive cam 44' is contacting the first cam follower 46' when the adjustment flexure 50' is in the unflexed neutral position, there is no control deadband to pass through. The same applies when the drive cam 44' is rotated backward towards the second cam follower 48'.

Referring now to FIG. 8, a flow diagram 200 on a method for making an optical adjustment device 40 for at least one optical component 32 will be discussed. From the start (Block 202), the method includes mounting an adjustment flexure 50 to a base 41 at Block 202. The adjustment flexure 50 is moveable between an unflexed neutral position and a flexed first position, and between the unflexed neutral position and a flexed second position. A rotatable drive shaft 42 is mounted to the base 41 at Block 204, and a drive cam 44 is mounted to the rotatable drive shaft 42 at Block 206. The method includes operatively coupling a first cam follower 46 between the drive cam 44 and the adjustment flexure 50 at Block 208 to selectively move the adjustment flexure 50 between the unflexed neutral position and the flexed first position. The method further includes operatively coupling a second cam follower 48 between the drive cam 44 and the adjustment flexure 50 at Block 210 to selectively move the adjustment flexure 50 between the unflexed neutral position and the flexed second position. The method ends at Block 212.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

The invention claimed is:

1. A satellite comprising:
a satellite housing;
at least one optical component carried by the satellite housing; and
an optical adjustment device coupled to the at least one optical component and comprising
a base,
an adjustment flexure carried by the base and moveable between an unflexed neutral position and a flexed first position, and between the unflexed neutral position and a flexed second position,
a rotatable drive shaft carried by the base,
a drive cam carried by the rotatable drive shaft,
a first cam follower operatively coupled between the drive cam and the adjustment flexure to selectively move the adjustment flexure between the unflexed neutral position and the flexed first position, and
a second cam follower operatively coupled between the drive cam and the adjustment flexure to selectively move the adjustment flexure between the unflexed neutral position and the flexed second position.

2. The satellite according to claim 1 wherein the at least one optical component comprises a focus mirror.

3. The satellite according to claim 1 wherein the adjustment flexure comprises an upper frame member, a lower frame member, and a plurality of flexure linkage members coupled therebetween.

4. The satellite according to claim 3 wherein the upper frame member, the lower frame member and the plurality of flexure linkage members are integrally formed as a monolithic unit.

5. The satellite according to claim 1 comprising an electrically controllable lock associated with the adjustment flexure to selectively lock the adjustment flexure in the unbiased neutral position.

6. The satellite according to claim 1 comprising a position sensor configured to sense a position of the adjustment flexure, and a drive motor operatively coupled to the drive shaft.

7. The satellite according to claim 6 comprising a controller coupled to the drive motor and the position sensor, and configured to rotate the drive cam to move the adjustment flexure.

8. The satellite according to claim 1 wherein the optical adjustment device comprises a first shaft for the first cam follower and a second shaft for the second cam follower, with the first and second shafts being coplanar with the drive shaft for the drive cam.

9. The satellite according to claim 1 wherein the optical adjustment device comprises a first shaft for the first cam follower and a second shaft for the second cam follower, with the first and second shafts being non-coplanar with the drive shaft for the drive cam.

10. The satellite according to claim 1 wherein the unflexed neutral position of the adjustment flexure defines a gap between the drive cam and the first and second cam followers.

11. An optical adjustment device for at least one optical component comprising:

a base;
an adjustment flexure carried by the base and moveable between an unflexed neutral position and a flexed first position, and between the unflexed neutral position and a flexed second position;
a rotatable drive shaft carried by the base;
a drive cam carried by the rotatable drive shaft;
a first cam follower operatively coupled between the drive cam and the adjustment flexure to selectively move the adjustment flexure between the unflexed neutral position and the flexed first position; and
a second cam follower operatively coupled between the drive cam and the adjustment flexure to selectively move the adjustment flexure between the unflexed neutral position and the flexed second position.

12. The optical adjustment device according to claim 11 wherein the at least one optical component comprises a focus mirror.

13. The optical adjustment device according to claim 11 wherein the adjustment flexure comprises an upper frame member, a lower frame member, and a plurality of flexure linkage members coupled therebetween.

14. The optical adjustment device according to claim 13 wherein the upper frame member, the lower frame member and the plurality of flexure linkage members are integrally formed as a monolithic unit.

15. The optical adjustment device according to claim 11 comprising an electrically controllable lock associated with the adjustment flexure to selectively lock the adjustment flexure in the unbiased neutral position.

16. The optical adjustment device according to claim 11 comprising a position sensor configured to sense a position of the adjustment flexure, and a drive motor operatively coupled to the drive shaft.

17. The optical adjustment device according to claim 16 comprising a controller coupled to the drive motor and the position sensor, and configured to rotate the drive cam to move the adjustment flexure.

18. The optical adjustment device according to claim 11 wherein the optical adjustment device comprises a first shaft for the first cam follower and a second shaft for the second cam follower, with the first and second shafts being coplanar with the drive shaft for the drive cam.

19. The optical adjustment device according to claim 11 wherein the optical adjustment device comprises a first shaft for the first cam follower and a second shaft for the second cam follower, with the first and second shafts being non-coplanar with the drive shaft for the drive cam.

20. A method for making an optical adjustment device for at least one optical component comprising:
mounting an adjustment flexure to a base, the adjustment flexure being moveable between an unflexed neutral position and a flexed first position, and between the unflexed neutral position and a flexed second position;
mounting a rotatable drive shaft to the base;
mounting a drive cam to the rotatable drive shaft;
operatively coupling a first cam follower between the drive cam and the adjustment flexure to selectively move the adjustment flexure between the unflexed neutral position and the flexed first position; and
operatively coupling a second cam follower between the drive cam and the adjustment flexure to selectively move the adjustment flexure between the unflexed neutral position and the flexed second position.

21. The method according to claim 20 wherein the at least one optical component comprises a focus mirror.

22. The method according to claim 20 wherein the adjustment flexure comprises an upper frame member, a lower frame member, and a plurality of flexure linkage members coupled therebetween.

23. The method according to claim 22 wherein the upper frame member, the lower frame member and the plurality of flexure linkage members are integrally formed as a monolithic unit.

24. The method according to claim 20 mounting an electrically controllable lock to the adjustment flexure to selectively lock the adjustment flexure in the unbiased neutral position.

25. The method according to claim 20 operatively coupling a position sensor to the adjustment flexure to sense a position of the adjustment flexure, and operatively coupling a drive motor to the drive shaft.

26. The method according to claim 25 operatively coupling a controller to the drive motor and the position sensor, and configured to rotate the drive cam to move the adjustment flexure.

* * * * *